May 12, 1925.
W. F. JEANS
EGG TURNER
Filed Feb. 12, 1924
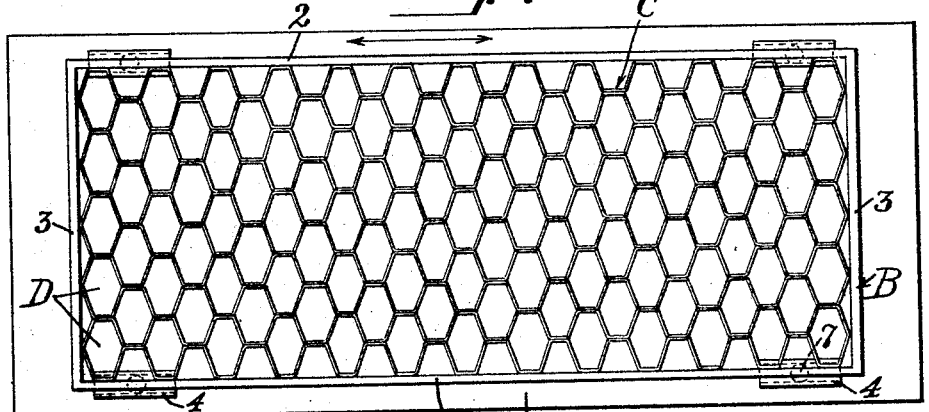
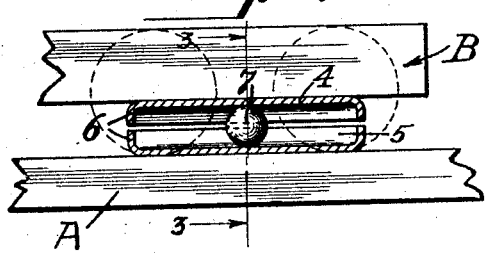
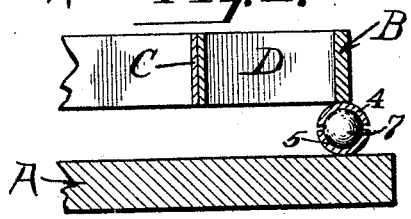
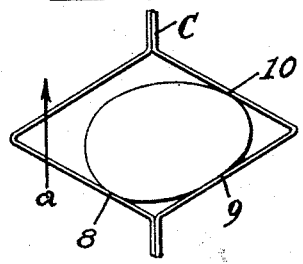
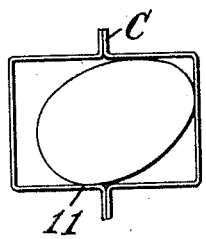
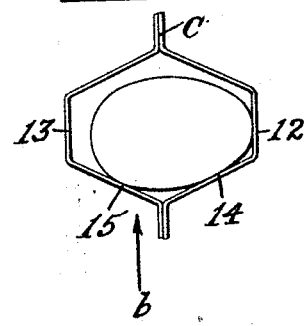
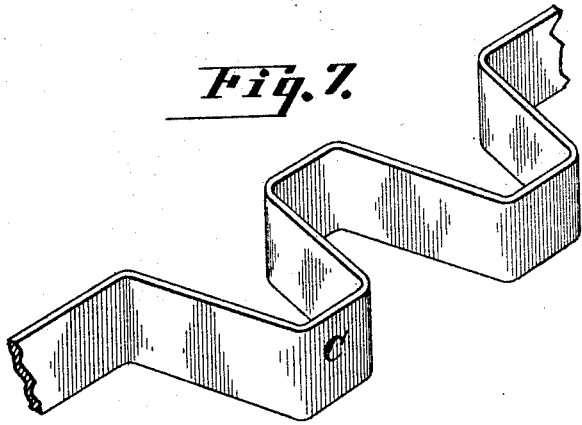
Inventor
WILLIAM F. JEANS.

Patented May 12, 1925.

1,537,307

UNITED STATES PATENT OFFICE.

WILLIAM F. JEANS, OF SANTA ROSA, CALIFORNIA.

EGG TURNER.

Application filed February 12, 1924. Serial No. 692,241.

*To all whom it may concern:*

Be it known that I, WILLIAM F. JEANS, a citizen of the United States, residing at Santa Rosa, county of Sonoma, and State of California, have invented new and useful Improvements in Egg Turners, of which the following is a specification.

This invention relates to egg turners, and especially to that type employed in incubators.

Various types of egg turners have been and are employed in incubators by which the numerous eggs supported on one or more trays may be manually turned in unison, and egg turners have also been employed which are automatically actuated at suitably timed intervals; for instance, by temperature variations as described in my former patent entitled "Egg turner", issued March 11, 1919, No. 1,297,175.

Practically all egg turning devices, including that illustrated in the patent referred to, which have come under my observation have proven impractical as they do not insure proper turning of the eggs and do not maintain the eggs in a horizontal position. That is, the eggs have a tendency to climb within the cells of the turning trays and as such are liable to assume inclined positions and in some instances substantially vertical position. This is far from desirable as the loss, due to unhatched eggs, becomes fairly great.

Experience on my part has proven that the best results are obtained when the eggs are properly turned and maintained in a horizontal position.

The object of the present invention is, therefore, to generally improve and simplify the construction and operation of egg turning devices of the character described; to provide a turning tray which will properly turn the eggs and which will insure horizontal positioning of the same.

One form which my invention may assume is exemplified in the following description and illustrated in the accompanying drawings, in which—

Fig. 1 is a plan view of the egg turning tray and its support.

Fig. 2 is a detail side elevation of one end of the tray and the support, said view also showing the anti-friction bearing member by which the turning tray is supported.

Fig. 3 is a cross-section on line 3—3, Fig. 2.

Fig. 4 is a diagrammatic plan view of a diamond shaped egg receiving cell.

Fig. 5 is a diagrammatic plan view of a rectangular shaped egg receiving cell.

Fig. 6 is a diagrammatic view of the hexagonal elongated egg receiving cell employed in the present invention.

Fig. 7 is a detail perspective view of one of the strips from which the egg receiving cells are formed.

Referring to the drawings in detail, and particularly to Figs. 1, 2, 3 and 7, A indicates a suitable support which may be represented by one of the shelves of an incubator, and B the rectangular shaped egg turning tray which forms the subject matter of the present invention. This tray and exterior frame consisting of side sections 2 and end sections 3 which may be constructed of wood, sheet iron or any other suitable material.

Extending lengthwise of the frame are a plurality of thin metal strips, generally indicated at C, which are bent as shown in Fig. 7 to form elongated hexagonal shaped egg receiving cells such as indicated at D. That is, each strip is bent as shown in Fig. 7 to form one-half of each egg receiving cell, but as the strips are placed side by side with their cell portions opposing each other, it can readily be seen that a series of elongated hexagonal shaped cells are formed in which the eggs may be deposited. The thin metal strips may be riveted or otherwise secured to the exterior frame and they may similarly be secured with relation to each other by spot welding, soldering, riveting or otherwise.

A unitary frame structure is in this manner obtained which is capable of receiving a considerable number of eggs, the number of eggs received or handled depending upon the size of the egg turning tray or the incubator provided for its reception.

A turning tray of this character may be manually operated so as to turn the eggs over at suitably timed intervals, or means may be employed for automatically moving the egg turning tray as described in my former patent previously referred to. This feature does not form any part of the present invention and it may therefore be considered that the tray is manually shifted from one position to another when turning the eggs.

For the purpose of limiting the movement of the egg turning tray, and also for the purpose of affording as little resistance as possible, anti-friction bearings or supports are employed. These bearings are best illustrated in Figs. 1, 2 and 3. They consist of half round tube sections of suitable length such as indicated at 4 and 5. The upper half round tube sections are inverted and are secured to the respective corners of the frame B. The lower bearing sections are also half round tube sections and are secured to the base or main support A. The respective tube sections align and their ends are closed by end sections such as indicated at 6. A ball bearing is then interposed between each set of bearing members and an anti-friction support is thus provided which reduces friction and resistance to a minimum. The ball bearings are indicated at 7 and as their movement is restricted by the end sections 6, movement of the turning tray is similarly limited and proper turning of the eggs is insured.

It was previously stated in the specification that numerous egg turning trays have been and are employed in incubators, and that they are more or less unsatisfactory as they do not insure proper turning of the eggs, nor do they maintain the eggs in a horizontal position.

It is well known that an egg is, practically speaking, substantially elliptical in shape and that one end is slightly heavier than the other. An egg, therefore, has a tendency to assume a slight inclined position with relation to its longitudinal axis and as such will tend to roll about its larger end. If the cells or pockets in an egg turning tray are diamond shaped as shown in Fig. 4, and if the cell or tray is moved in the direction of arrow $a$, the egg will tend to contact at three points such as indicated at 8, 9 and 10. One end of the egg therefore tends to become wedged between the points 9 and 10, while the larger or opposite end engages the point 8. These points of contact produce such a friction that the egg is often prevented from turning and as such merely slides when the frame is moved. Again, if the egg does turn the end engaging the points 9 and 10 has a tendency to climb and the egg thus assumes an inclined position and, in some instances, climbs to such an extent as to assume a substantially vertical position, and when the egg either assumes a vertical or inclined position, the friction is so great that the egg will merely slide when the frame is moved and as it is not turned it does not become uniformly heated and a large number of unhatched eggs will be the result. If the cells are rectangular shaped as shown in Fig. 5, the same thing happens. The smaller end of the egg usually wedges itself in one corner and then tends to climb, while the larger and heavier end engages the side of the cell as indicated at 11. The frictional resistance thus obtained is often sufficient to prevent turning of the egg, and even if it does turn, it tends to climb and is thus brought to an angular or vertical position.

By experience I have found that best results are obtained by shaping the cells or pockets so that they form an elongated hexagonal figure. This particular shape has proven very efficient and is diagrammatically illustrated in Fig. 6. The two end sections of the elongated hexagonal shaped cell are in this instance indicated at 12 and 13. The sides of the hexagon are long as indicated at 14 and 15, and if the tray or cell is moved in the direction of arrow $b$ only three points of contact will be made with the egg, one point being indicated at 12, and the other points of contact being indicated at 14 and 15.

By again referring to Fig. 6 it will be noted that the point of contact 12 is made with the point or end of the egg, and as this presents a very small surface practically no frictional resistance is exerted. The main points of contact therefore occur along the sides indicated at 14 and 15 and as this frictional resistance is imposed on one side only of the egg, the egg is free to turn, and as the end of the egg only contacts at one point it cannot climb and the egg will therefore assume a horizontal or a substantially horizontal position at all times. Turning of the egg is thus insured and horizontal or substantially horizontal positioning is maintained. All danger of the eggs climbing and assuming a vertical position is eliminated and a substantially 100% hatch can be depended upon, providing the eggs are fertile.

The main feature of the present invention is, therefore, the hexagonal shape of the egg receiving cells or pockets, and whether the cells are formed from metallic strips or otherwise, the spirit of the invention is not changed.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. An egg turning tray, comprising a frame, a support therefor upon which the frame is reciprocally movable, and a plurality of hexagonally shaped pockets formed in the frame for the reception of eggs, said pockets having ends parallel to each other and parallel to the line of movement of the frame.

2. An egg turning tray, comprising a frame, a support therefor upon which the frame is reciprocally movable, and a plurality of pockets formed therein for the reception of eggs, the sides of said pockets being V-shaped and the ends being parallel with relation to each other and to the line of movement of the frame.

3. An egg turning tray, comprising a rectangularly shaped frame movable in the direction of its longitudinal axis, a support for the frame, and a plurality of cells or pockets formed in the frame for the reception of eggs, one egg in each pocket, said pockets having an elongated hexagonal shape and the longitudinal axis of each pocket extending transversely of the frame, said pockets having two V-shaped sides and two ends parallel with relation to each other and parallel with relation to the direction of movement of the frame.

WILLIAM F. JEANS.